United States Patent [19]

Grundmann

BEST AVAILABLE COPY

[11] E Re. 29,081

[45] Reissued Dec. 14, 1976

[54] ELECTROMAGNETO-MECHANICAL ACTUATOR

[75] Inventor: John F. Grundmann, Torrance, Calif.

[73] Assignee: Moog Inc., East Aurora, N.Y.

[22] Filed: Nov. 28, 1975

[21] Appl. No.: 636,049

Related U.S. Patent Documents

Reissue of:

[64] Patent No.: 3,681,726
Issued: Aug. 1, 1972
Appl. No.: 147,381
Filed: May 27, 1971

[52] U.S. Cl. ..... 335/228; 310/37; 310/80

[51] Int. Cl.[2] ..... H01F 7/08

[58] Field of Search ..... 335/228; 310/20, 37, 310/80; 318/115

[56] References Cited

UNITED STATES PATENTS

| | | | |
|---|---|---|---|
| 1,464,824 | 8/1923 | Kollock et al. | 310/80 |
| 2,718,614 | 9/1955 | Gamble | 335/228 |

OTHER PUBLICATIONS

A. Staniforth "Rotary-to-Linear Actuator", Reprint of May 1960, Issue of *Electrical Manufacturing*, July 18, 1960.

*Primary Examiner*—George Harris
*Attorney, Agent, or Firm*—Sommer & Sommer

[57] ABSTRACT

An electromagneto-mechanical actuator comprising a brushless D.C. torque motor capable of producing a torque proportional to the current fed to coil windings which are arranged as a stator, a permanent magnet being the rotor, these windings being severally arranged opposite the pole end faces of the magnet and being reversely wound so that the magnetomotive forces generated by these windings cancel out each other and thereby eliminate magnetic hysteresis. The pivotal movement of the rotor is converted to translational or rectilinear movement of an output drive element through a substantially frictionless band drive having no backlash. The actuator is preferably arranged in a closed servo loop so that the proportionality of its response can be utilized.

15 Claims, 13 Drawing Figures

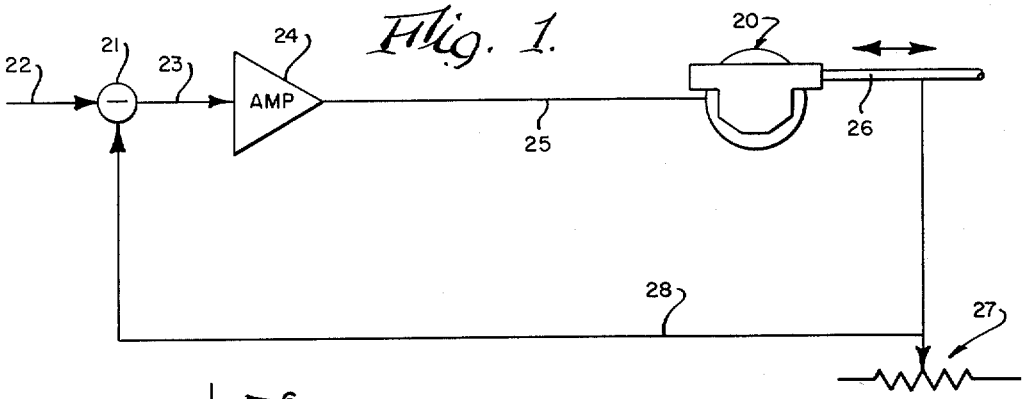
Fig. 1.
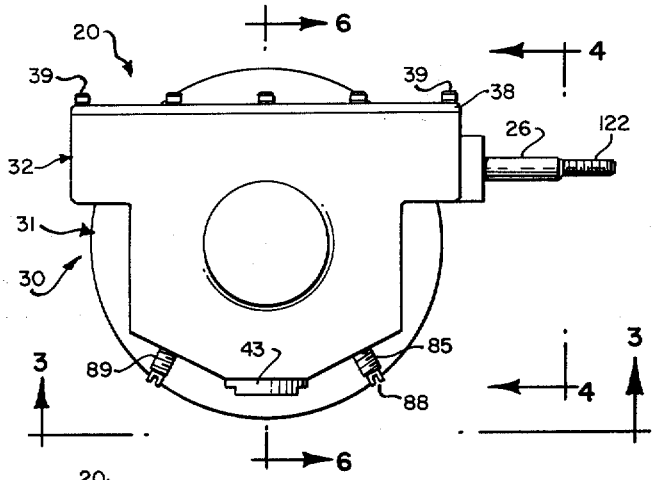
Fig. 2.
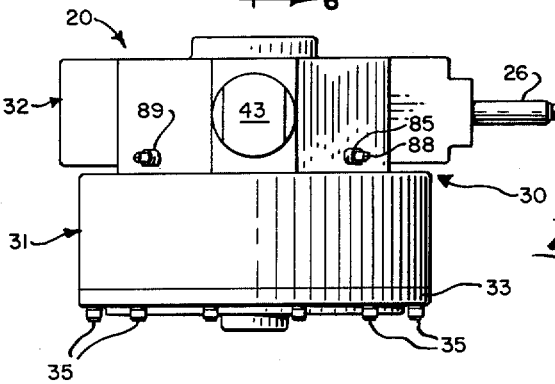
Fig. 3.
Fig. 4.
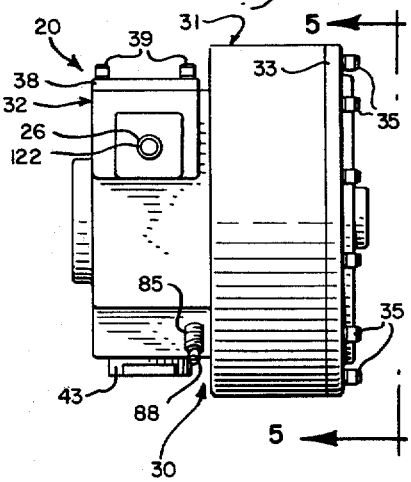
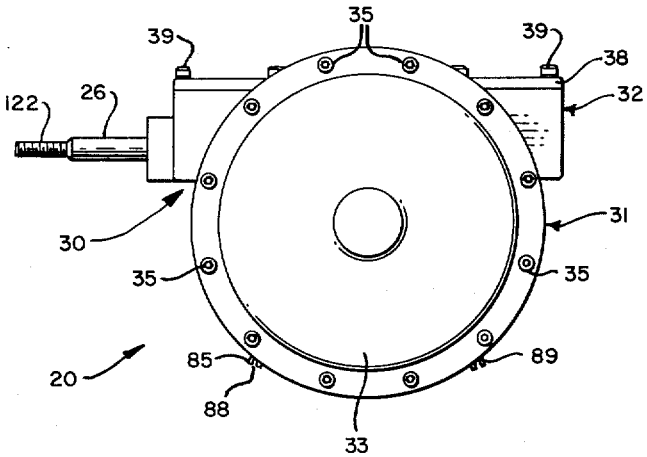
Fig. 5.
INVENTOR.
John F. Grundmann
BY
Sommer, Weber + Gastel
ATTORNEYS INVENTOR.
John F. Grundmann
BY
Sommer, Weber + Gaster
ATTORNEYS INVENTOR.
John F. Grundmann
BY
Sommer, Weber & Gastel
ATTORNEYS INVENTOR.
John F. Grundmann
BY
Sommer, Weber & Gastel
ATTORNEYS Fig. 12.
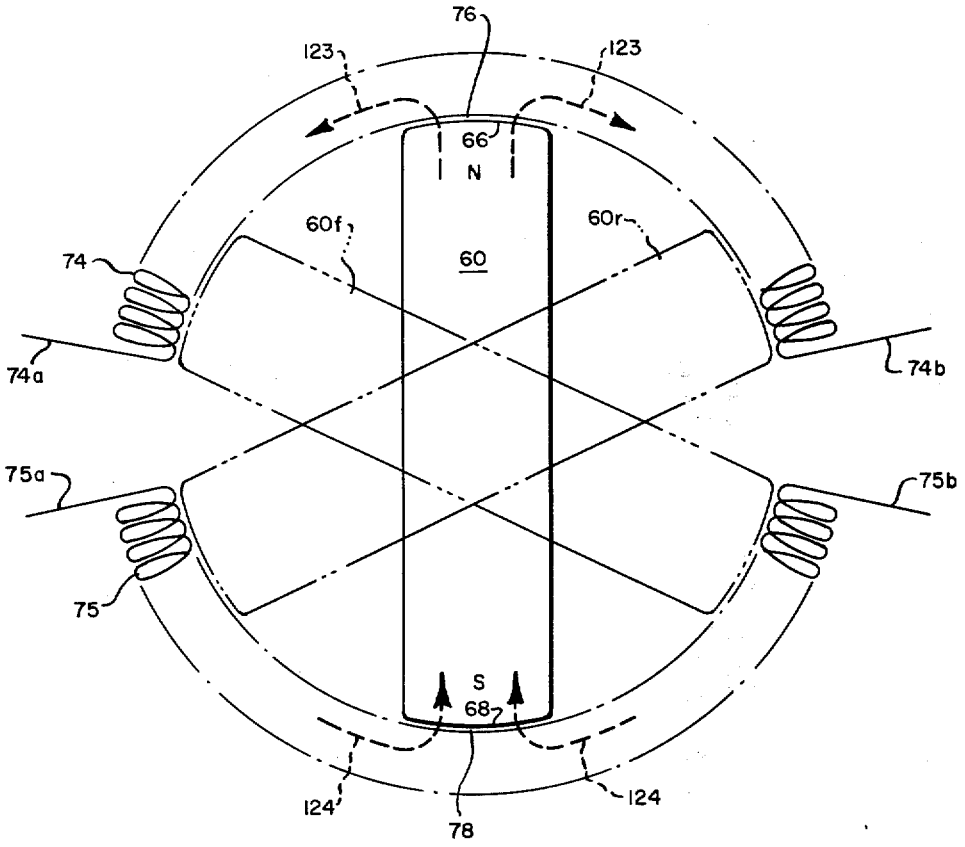
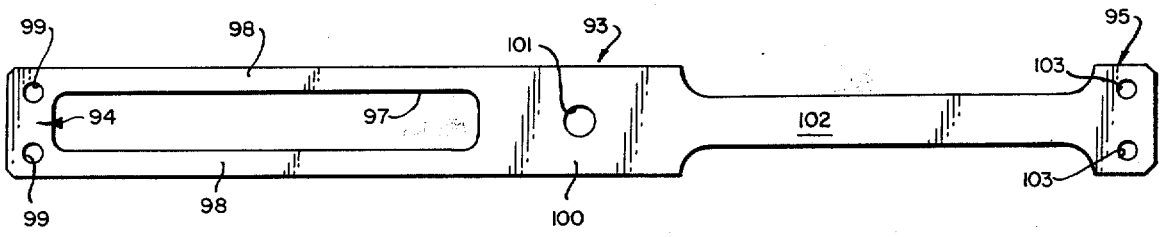
Fig. 13.
INVENTOR.
John F. Grundmann
BY
Sommer, Weber + Gastel
ATTORNEYS

ELECTROMAGNETO-MECHANICAL ACTUATOR

Matter enclosed in heavy brackets [ ] appears in the original patent but forms no part of this reissue specification; matter printed in italics indicates the additions made by reissue.

BACKGROUND OF THE INVENTION

While the electromagneto-mechanical actuator of the present invention may be applied to any useful purpose, it has particular advantage in positioning the head for magnetic computer data storage of the type where a reading head is positioned radially over the desired track of a memory disk.

In the past various types of actuating means for positioning such a head have been employed. One of the first types employed for this purpose comprised electrical servomotors but these had a relatively slow response in the order of 100 milliseconds.

Another type involved an on-off solenoid-controlled electrohydraulic actuator and had a faster response in the order of 60 milliseconds but this type had the disadvantages of oil seepage which produced oil mist to deposit as films of oil on the magnetic disks, and also many parts were involved which made the cost relatively high. While more sophisticated analog hydraulic devices can be employed to produce a faster response time, these devices still suffer from the other disadvantages of the hydraulic type.

The current trend in this art is to use a voice coil electromagnetic translational actuator which has a response time of about 40 milliseconds but has other undesirable characteristics such as being physically relatively large involving a permanent magnet weighing about fifty pounds, having a high permanent magnet flux field from which flux leakage gives potential data erasure problems, requiring the voice coil to be fixed to the reading head and therefore makes for a difficult voice coil mechanical suspension, having the permanent magnet structure separately mounted from the voice coil, possessing unreliability of the lead-out wires from the bobbin of the voice coil which has a relatively long stroke of two inches resulting in excessive flexing of these wires, requiring a relatively high electrical current to develop a large force inasmuch as the device was direct acting, and having poor coil heat dissipation capability which led to unreliability.

SUMMARY OF THE INVENTION

The present invention relates to an electromagneto-mechanical actuator which overcomes the disadvantages of the prior art actuators of the aforementioned types and is fast acting, proportional, accurate, possesses a long life and is relatively inexpensive.

Compared to the prior art electrical servomotors, the actuator of the present invention is desirably much faster, having a response in the order of about 40 milliseconds.

Relative to the prior art hydraulic type actuators, the actuator of the present invention involves no hydraulic fluid and therefore eliminates the disadvantages incident thereto.

With respect to the prior art voice coil electromagnetic actuators, the actuator of the present invention is smaller, of lighter weight employing a permanent magnet which is at least about five times as light, utilizes a lower level magnetic field providing relatively lower available leakage flux which is better contained, is embodied in a self-supported unit to which an electrical input is fed and from which a mechanical output drive element extends so that if defective for some reason the entire unit is replaced without subassembly alignment problems, and includes fixed coils having no moving electrical connections and because of a good heat sink capability the coils can be energized continuously.

Other outstanding advantages of the present inventive actuator are that there is no coil-induced flux so that there is essentially zero magnetic hysteresis, the torque created is proportional to coil current and therefore the actuator readily lends itself for use as a servo component rather than an on-off component, there is constant torque proportionality throughout a wide angular excursion of the rotor, rotary motion is converted to rectilinear motion through a linear motion relationship involving low friction and zero backlash so that positional accuracy of the output drive element is high throughout a relatively long stroke. In the case of the present inventive actuator being used for positioning a reading head over a magnetic memory disk the stroke is typically about two inches.

In accordance with the present invention, an electromagneto-mechanical actuator is provided which comprises a brushless D.C. torque motor including a rotor and a stator having a relationship such that the torque developed by the rotor is proportional to the current fed to the stator, and this torque is converted through a low inertia, low friction, zero backlash and simple band drive device to linearly related rectilinear motion of an output element utilized for the purpose desired.

Other advantages of the present invention will be apparent from a reading of the following detailed description of a preferred embodiment illustrated in the accompanying drawings.

BRIEF DESCRIPTION OF THE DRAWINGS

FIG. 1 is a diagram of a closed servo loop in which the electromagneto-mechanical actuator of the present invention is arranged.

FIG. 2 is a right side elevational view of said actuator, the same as shown in FIG. 1 but greatly enlarged.

FIG. 3 is a bottom elevational view of the actuator shown in FIG. 2, taken on line 3—3 thereof.

FIG. 4 is a front end elevational view of the actuator shown in FIG. 2, taken on line 4—4 thereof.

FIG. 5 is a rear elevational view of the actuator shown in FIG. 2, taken on line 5—5 of FIG. 4.

FIG. 12 is a schematic view of the stator and rotor of the torque motor forming part of said actuator.

FIG. 13 is a plan view of said band in an unlooped or flattened out condition.

DESCRIPTION OF THE PREFERRED EMBODIMENT

Figure 6:
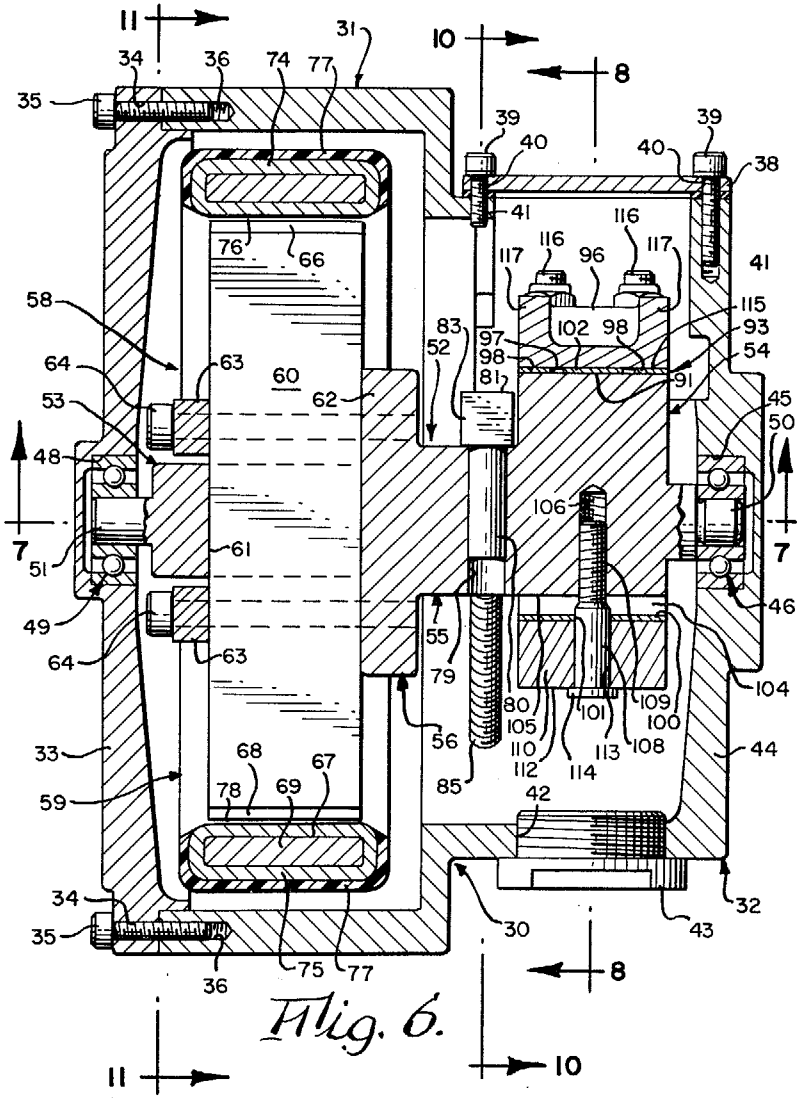
FIG. 6 is a still further enlarged vertical transverse sectional view of said actuator, taken on line 6—6 of FIG. 2.
Figure 7:
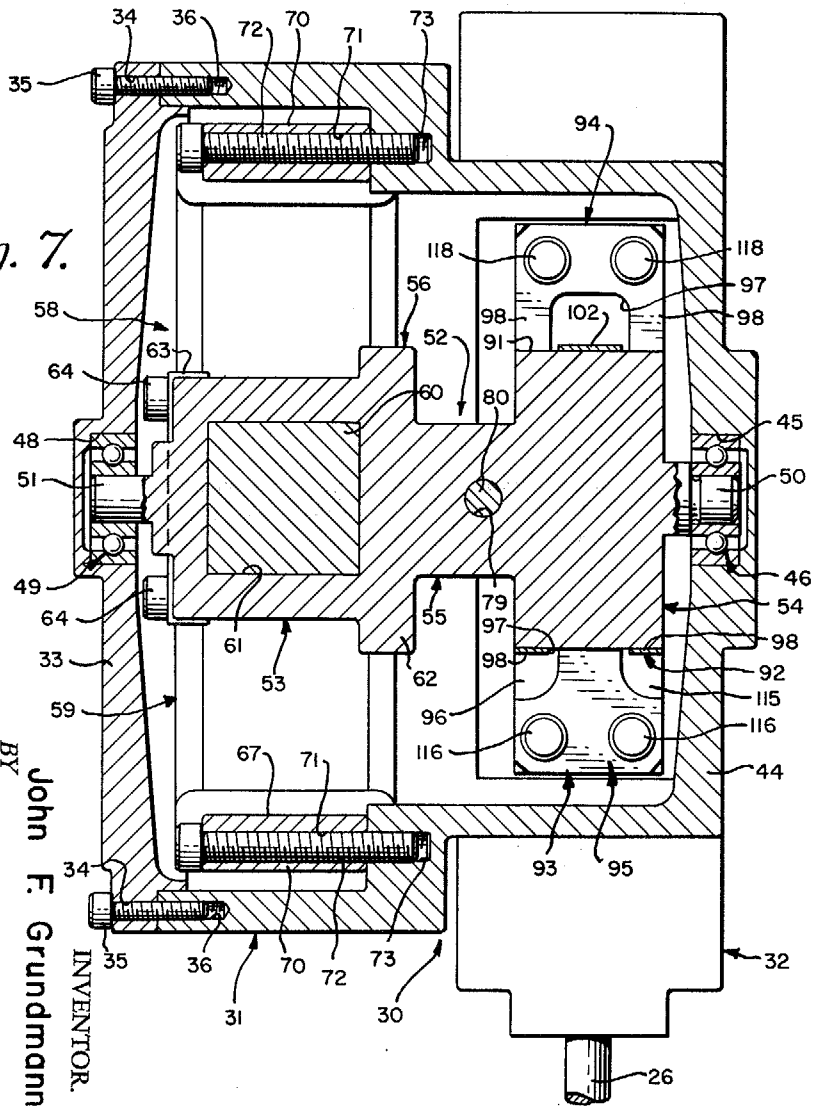
FIG. 7 is a horizontal sectional view thereof, taken on line 7—7 of FIG. 6.

The electromagneto-mechanical actuator is represented by the numeral 20 in FIG. 1 and is there shown as arranged in a servo loop including a summing point 21 to which a command signal input represented by the line 22 is fed. An error signal represented by the line 23 leads from this summing point to an amplifier 24 and a line 25 from this amplifier serves as an electric input to the actuator. This actuator has a mechanical output drive element represented by a rod 26. Operatively associated with this output element are position feedback means indicated generally at 27 which may be of any suitable form such as a linear variable differential transformer to generate an electrical position feedback signal which is transmitted via line 28 to summing point 21. It is the algebraic sum of the command signal and the position feedback signal which determines the error signal which after amplification is fed to the electromagneto-mechanical actuator embodying the present invention.

The actuator 20 is shown as having a housing 30 including a circular left section 31 and an integral T-shaped right section 32. Circular section 31 is open on its outer lateral side which is closed by a removable cover or end cap 33 having a series of holes 34 circumferentially spaced which receive screws 35 threaded into aligned recesses 36 provided in the rim portion of this section. T-shaped section 32 is shown as having an opening in its top which is of generally rectangular shape and normally closed by a removable cover 38 secured by a plurality of screws 39 which project through holes 40 in this cover plate and are received in threaded recesses 41 provided in this section. The lower end of the vertical bar portion of the T-shaped section 32 is shown as provided with an internally threaded circular hole 42 adapted to receive a removable plug 43 for a purpose hereinafter disclosed.

The outer lateral integral side wall 44 of the T-shaped housing section 32 is shown as having a bearing cup 45 to receive an anti-friction bearing 46. The rear wall provided by the cover or end cap 33 is provided with a similar cup-shaped recess 48 to receive another anti-friction bearing 49. The axes of these bearings are aligned and adapted to receive the right and left concentric cylindrical reduced end portions 50 and 51, respectively, of a shaft 52 which includes a left section 53, a right section 54, and an intermediate section 55.

Rear shaft section 53 provides part of the rotor 56 of a torque motor 58 which also includes a stator 59. This rotor comprises a permanent magnet 60 in the form of a straight bar square in cross section and secured to rear shaft section 53 and suitably secured thereto so that the two elements rotate together. As shown, shaft section 53 is provided with a diametrically extending square-shaped through hole 61 in which the permanent magnet 60 is arranged. Adjacent its inner part shaft section 53 is shown as provided with an outwardly extending annular integral collar 62. Magnet 60 is secured in position on shaft section 53 by a pair of clamp bars 63,63 secured by screws 64 at their opposite ends received in internally threaded recesses provided in collar 62. In order to accommodate the clamp bars 63, the portion of shaft section 53 outwardly of opening 61 therein is shown as cut away to provide flats 65,65, each accommodating one of the clamp bars. The outer end faces 66 and 68 at opposite ends of the permanent magnet are curved cylindrically so as to have the same radius and to be concentric with the horizontal pivotal axis of shaft 52.

Surrounding this rotor 56 is stator 59 which is shown as comprising a stator ring 69 of substantially rectangular shape in cross section, elongated in the direction of the horizontal pivotal axis of shaft 52, having an inner cylindrical surface 67 concentric with said pivotal axis and also a pair of diametrically opposed outwardly extending integral attaching ears 70,70, each provided with a hole 71 through which a screw 72 extends which is received in an internally threaded recess 73 provided in a body portion of housing 30 intermediate the circular and T-shaped sections 31 and 32 thereof. Stator ring 69 may be made of any suitable material such as cold or hot rolled carbon steel. Helically wound around the upper semi-circular section of the stator ring 69 is an upper coil 74 of insulated conductive magnet wire. A similar coil 75, i.e. one having the same number of turns and same size and type of wire, but wound in the opposite direction from coil 74, is wound around the lower semi-circular section of this stator ring 69. These coils lie flat against the surfaces of this stator ring and may be covered on their outer side and ends by a suitable potting material as indicated at 77. Coil 74 terminates in leads 74a and 74b, and coil 75 in leads 75a and 75b, as indicated in FIG. 12. These leads suitably lead to the exterior of housing 30 and in the servo loop shown in FIG. 1 are operatively associated with line 24. While only one winding layer is shown in each coil, it is to be understood that several layers of windings can be wound around stator to make up each coil. Each coil has an arcuate extent in a circumferential direction less than 180° in order to permit mounting of the stator ring 69 on the housing by ears 70. The axial width of each coil is greater than that of the corresponding end face 66 or 68 of permanent magnet 60. A constant air gap 76 is provided between upper magnet end face 66 and upper coil 74 and a similar constant air gap 78 is provided between lower magnet end face 68 and lower coil 75.

The excursive range of the permanent magnet 60 about the pivotal axis of shaft 52 is limited by stop means, preferably adjustable, now to be described. Intermediate shaft section 55 is shown as provided with a diametral hole 79. Preferably press-fitted into this hole is the shank of a post 80 having an exposed enlarged block-like head 81 having opposite substantially radial rear and front stop surfaces 82 and 83, respectively. Rear surface 82 is adapted to engage abuttingly a cap 84 preferably made of plastic provided on the inner end of an upwardly and inwardly inclined adjusting rear screw 85 mounted in a threaded recess 86 provided in housing section 32. The outer lower end of this screw has a screw driver slot 88 or any other equivalent means to permit the application of a tool for turning the screw. A similar front screw 89 is provided on the opposite side of the shaft section 55, is similarly mounted and also has a cap 90 adapted to engage abuttingly front stop surface 83 on the post.

The rotary motion of the rotor 56 of the torque motor 58 is adapted to be converted into translational movement. For this purpose, right shaft section 54 is in the form of a cylindrical integral enlargement to provide a drum member having a cylindrical periphery 91 concentric with the horizontal pivotal axis of shaft 52.

Wrapped around this cylindrical periphery circumferentially through only a single revolution is the intermediate loop portion 92 of a flexible resilient band 93 having opposite end portions 94 and 95 severally adapted to be secured to a yoke member 96 arranged for rectilinear movement at a right angle to the pivotal axis of shaft 52. As shown, the yoke member 96 moves horizontally in a fore-and-aft direction and is arranged immediately above drum-shaped shaft section 54.

Referring to FIG. 13, band 93 in its unlooped, flattened out or developed condition is shown as being a generally elongated rectangular member of substantially uniformly thick resilient metal having a generally rectangularly shaped rear section in which a rectangularly shaped slot 97 is provided leaving on opposite sides lateral strip parts 98,98 integrally joined at their rear ends by the transverse rear outer end portion 94 shown as provided with a pair of spaced holes 99,99 and at its other end a web part 100 shown as provided with a central hole 101. The front section of the band is shown as having a side portion cut away on each side leaving a central longitudinally extending strip part 102 which is integrally attached at its inner or rear end to the web part 100 and extends forwardly therefrom and at its opposite outer or front end gradually enlarges laterally to provide the front end portion 95 shown as provided with a pair of spaced holes 103,103.

In order that the band member have no spring rate, the width of the central strip part 102 is uniform throughout its length and is substantially equal to the sum of the widths of the two laterally spaced, also uniformly wide, strip parts 98 integrally formed between rear end portion 94 and central web part 100. In other words, the transverse area of central strip part 102 is substantially equal to the sum of the transverse areas of the pair of laterally spaced strip parts 98.

Band 93 is wrapped around the cylindrical surface 91 of drum member 54 so that the hole 101 in the web part 100 of this band is opposite a groove 104 recessed from this cylindrical surface. At the base 105 of this groove is an internally threaded radial recess 106. The outer edges of the side walls of groove 104 are preferably rounded as shown.

Means cooperating with web part 100 are provided for securing band 93 to drum member 54 against relative circumferential movement. Such means comprises a stake 108 extending through hole 101 and having an externally threaded outer end shank portion 109 which screws into recess 106.

Means cooperating with web part 100 are also provided for tensioning the band 93. Such means preferably comprises a block 110 of wedge-shape in cross section having an inner end face 111, an outer end face 112 and a through hole 113 extending between said end faces. This block is arranged so that it projects at least partially into groove 104 and is arranged with its inner end face 111 spaced from the base 105 of this groove. The hole 113 in the block is aligned with the hole 101 in the web part 100. Stake 108 has its unthreaded inner end shank portion extending through these holes in the block and the web part and at its outer end has an integral enlarged head 114 which bears against block outer end face 112. In this arrangement, the web part 100 of the band extends along the side walls of groove 104 between the same and the opposing side faces of block 110 and also extends over the inner end face 111 of the block. Head 114 has an out of round recess so that a suitable tool can be inserted therein for turning screw 108, access to this head being provided by removing plug 43. Turning screw 108 adjusts the tension in band 93, the opposite end portions 94 and 95 of which are suitably secured to yoke member 96. For this latter purpose, this yoke member is shown as provided with a flat horizontal bottom surface 115 which extends substantially tangentially to the drum member. The front end section of the band 93 having the central strip part 102 is looped under the rear end section and is passed through the slot 97 between the laterally spaced strip parts 98. The front end portion 95 of the band at the outer end of the central strip part has its holes 103 aligned with vertical holes provided in the front end of yoke member 96, and through these holes severally extend nut and bolt fasteners 116. The rear end portion of the band has its holes 99 arranged in alignment with a pair of vertical holes arranged in the rear part of yoke member 96 and through these holes extend severally nut and bolt fasteners 118.

It will be seen that by turning screw 108 so as to move tensioning block 110 inwardly of groove 104 the band 93 is firmly wrapped around the cylindrical surface 91 of drum member 54 and may be placed in tension by the adjustment of this screw. Yoke member 96 has upstanding laterally spaced longitudinal integral ribs 117 to strengthen the member. The portions of the band on opposite sides of the central web part have a rolling, substantially frictionless, contact with the drum member as the latter pivots about the pivotal axis of the shaft. During the course of such movement, yoke member 96 is moved rectilinearly.

The output drive element in the form of rod 26 is shown as having an inner externally threaded end 119 which is screwed into an internally threaded horizontal recess 120 provided in the front end of yoke member 96. The intermediate unthreaded portion of rod 26 is cylindrical and guided on a suitable bearing 121 provided in the apertured front wall of T-shaped housing section 32. The outer end portion of rod 26 is externally threaded as indicated at 122 for suitable connection to any member (not shown) which is to be driven by this rod. It will be noted that this outer end portion 122 is arranged exteriorly of housing.

Figures 8, 9:
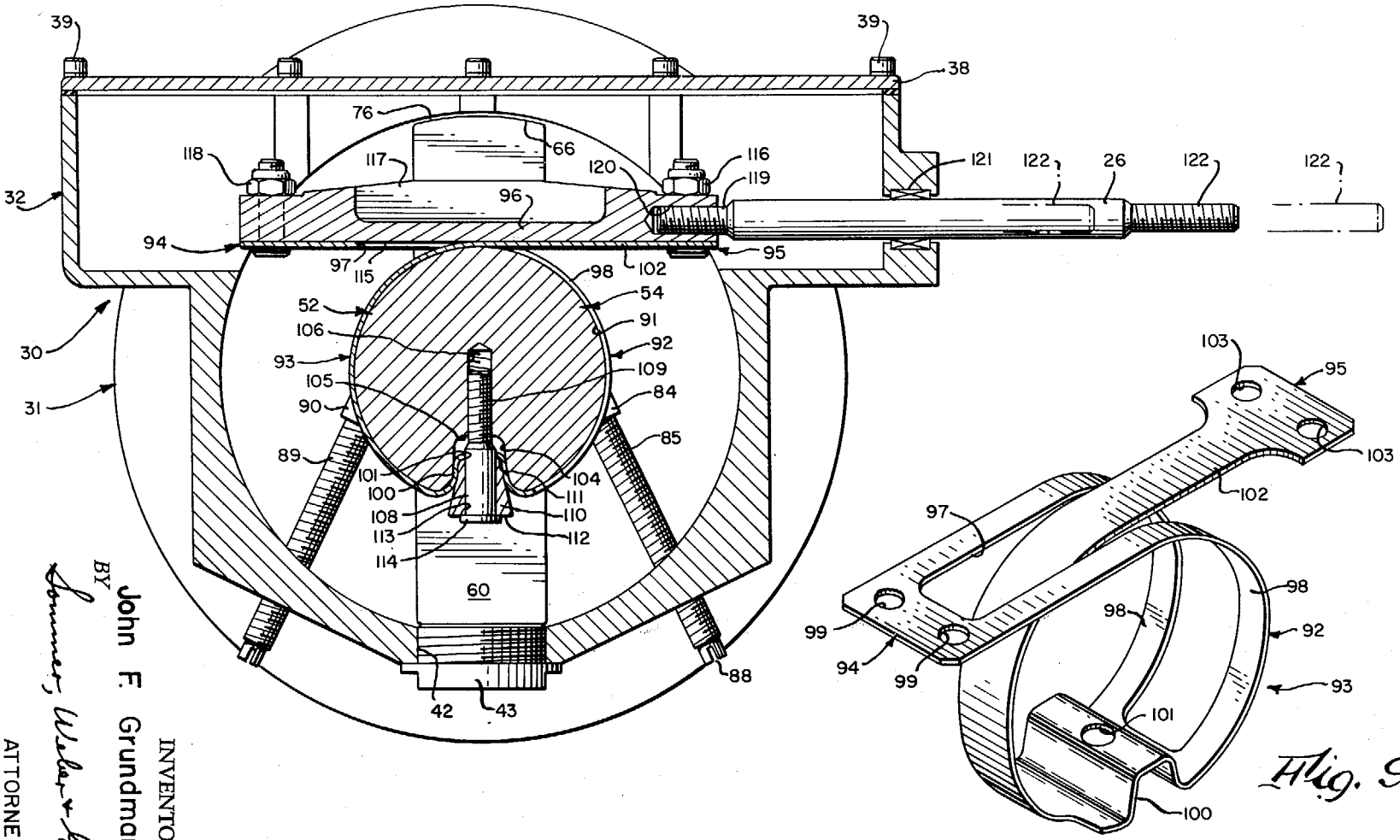
FIG. 8 is a vertical longitudinal sectional view thereof, taken on line 8—8 of FIG. 6.
FIG. 9 is a perspective view of the flexible resilient band in a looped condition, constituting an important component of said actuator.
Figure 10:
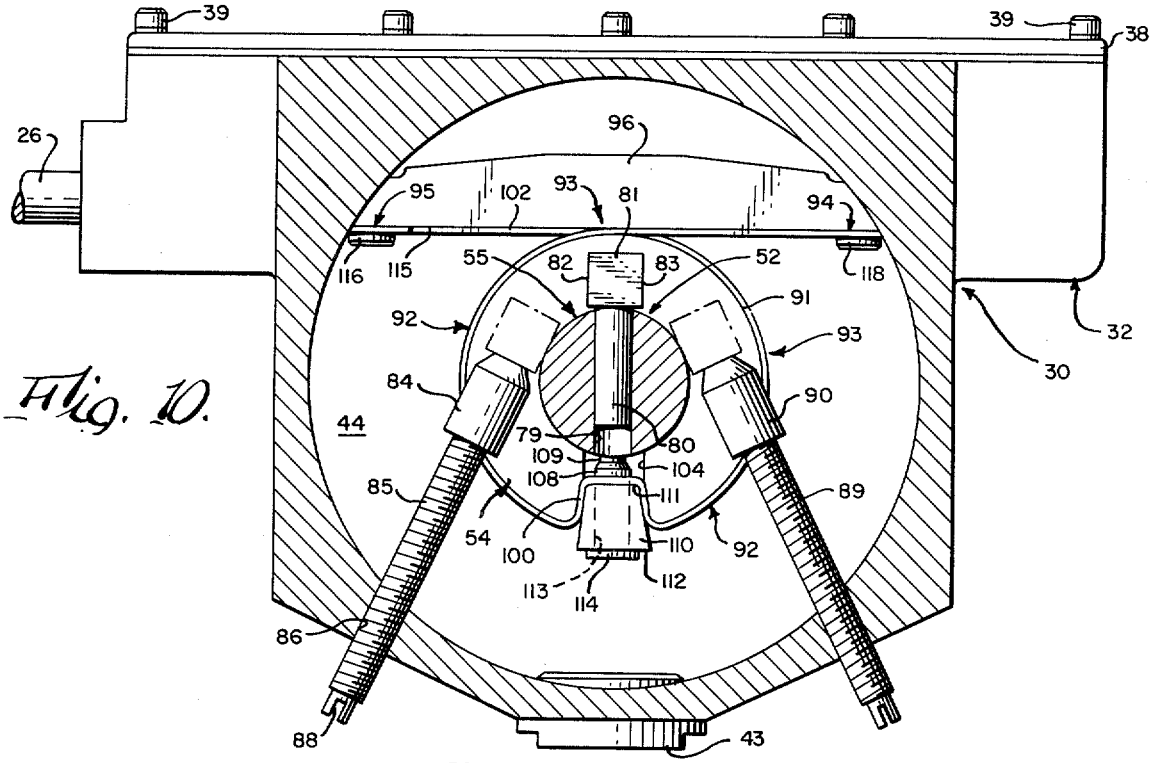
FIG. 10 is a vertical longitudinal sectional view of said actuator, taken on line 10—10 of FIG. 6.
Figure 11:
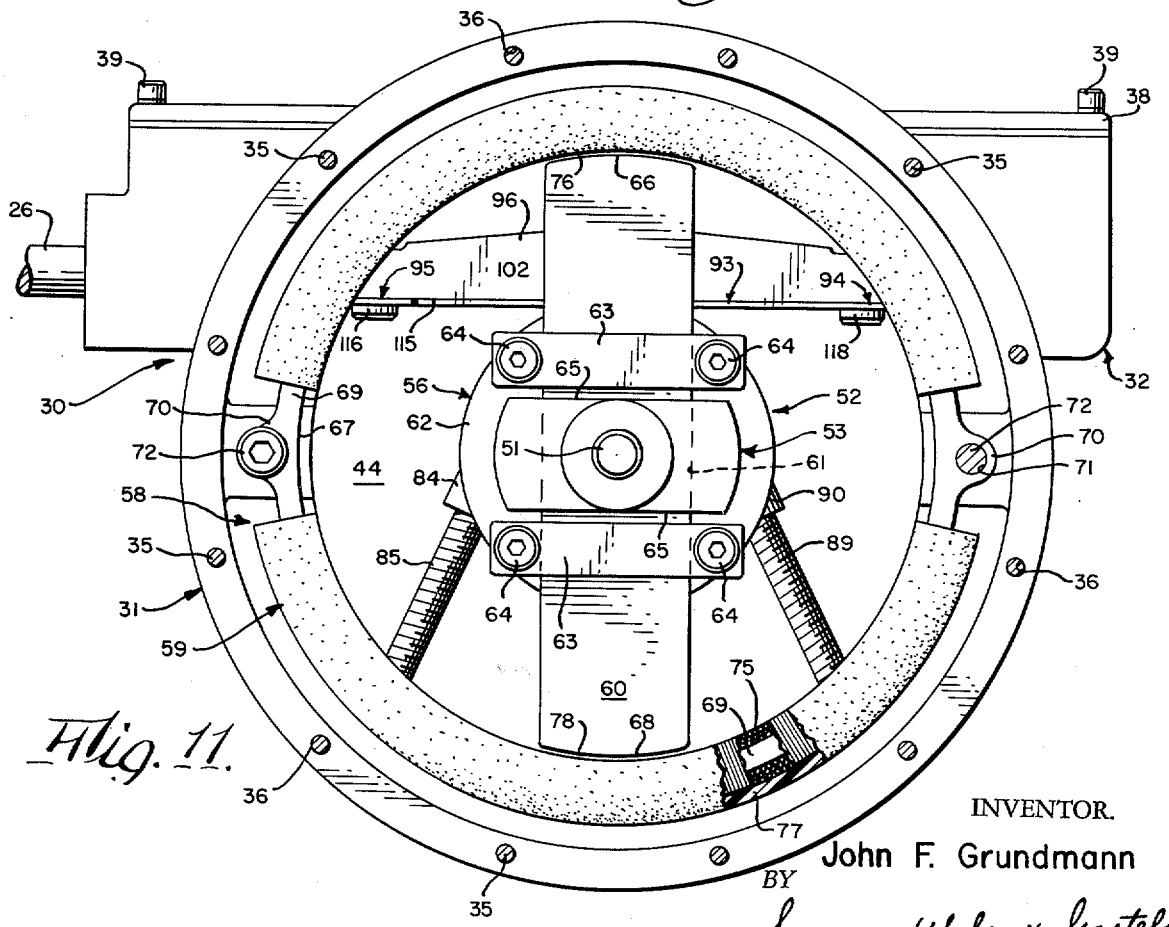
FIG. 11 is another vertical longitudinal sectional view thereof, taken on line 11—11 of FIG. 6.

Referring to FIG. 8, it will be seen that removal of plug permits access to the tensioning screw 108 for the desired adjustment of the tension in band 93 thereof. Removal of the upper flat cover plate 38 also permits access to yoke member 96 and the fastening means 116 and 118 for connecting the band 93 thereto.

OPERATION

With actuator 20 operatively arranged in the servo loop as shown in FIG. 1, let it be assumed that an electrical command signal in the form of a D.C. current having a given polarity is put in through line 22. This signal, algebraically summed with any electrical position feedback signal which for the moment is assumed to be zero, is fed as an error signal via line 23 to amplifier 24 wherein this signal is further amplified and fed via line 25 to the coils 74 and 75 of the torque motor 58. This signal fed to the coils will be a current having a certain polarity and magnitude.

Referring to FIG. 12 and assuming that the polarity of the signal is plus as applied to leads 74a and 75a, there will first be noted that by reason of the reversed direction of winding of one of the coils 74 and 75 with respect to the other that the magnetomotive force generated by one of these coils opposes that generated by the other coil. Since the coils are of the same type wire, carry the same current and are configurated similarly except for being wound in reversed fashion the coil induced fluxes cancel each other out and there is no change in flux circulating in the stator ring 69 and therefore zero magnetic hysteresis.

The permanent magnet 60 as illustrated in its solid line position in FIG. 12 has its north pole N at its upper end and its south pole S at its lower end so that the lines of flux will follow generally the paths represented by the arrowed broken lines 123 flowing across upper air gap 76 from the north pole N, this flux flowing through stator ring 69 downwardly and thence inwardly across lower air gap 78 as represented by the arrowed broken lines 124 toward the south pole S.

The circumferential extent of the magnet end faces 66 and 68 determines the number of wires in coils 74 and 75 which are opposite these end faces at a given time. The torque force developed by the torque motor is proportional to the flux in the air gaps 76 and 78, times the current flowing through the wires of the windings 74 and 75, times the number of wires opposing the magnet end faces 66 and 68. Inasmuch as the axial length of the coil wires is slightly greater than the axial length of the magnet end faces 66 and 68, these wires are effective over the full area of these faces.

Inasmuch as the flexible resilient metal band 93 as mounted on drum member 54 has no spring rate, it has no preferential position. Accordingly, yoke 96 connected to this band 93 will move until a position feedback signal is developed by means 26 which will negate the command signal input applied through line 22, this summing occurring at summing point 21. When the error signal is zero no current is applied to the windings of coils 74 and 75 and pivoting of rotor 56 and its shaft 52 stops. This will occur at the precise position intended since if the outer end of drive rod 26 is not at the proper location the position feedback signal in relation to the command input signal will produce an error signal to cause drive rod to be positiond until there is no error signal.

With the polarity of the signal input to coil leads 74a and 75a being plus, for the sake of example, the magnet 60 will be caused to rotate in one direction, say counterclockwise as viewed in FIG. 12, and thereby cause a similar rotation of shaft 52 and hence band 93 to produce a predetermined amount of forward rectilinear movement of yoke member 96 and its drive rod 26. The extreme limit of such counterclockwise direction is represented in FIG. 12 by position 60f of magnet 60, this being determined by stop surface 83 engaging stop cap 90.

If, on the other hand, the polarity of the current introduced into the windings of coils 74 and 75 is reversed to that just described, permanent magnet 60 will move in the opposite direction to an extreme limit represented by the position 60r of magnet 60 in FIG. 12, this being determined by stop surface 82 abuttingly engaging stop cap 84. Movement of magnet 60 toward its position 60r represents rearward movement of rod 26.

It will thus be seen that the torque applied by torque motor 58 is proportional to the magnitude of the current fed to the windings of coils 74 and 75 and that the direction of pivotal movement of such torque motor and hence shaft 52 will depend upon the polarity of such current. Accordingly, a brushless DC torque motor is provided in which the torque developed by such motor is proportional to the current fed to the coil windings of the stator. Such pivotal movement is converted linearly, substantially frictionlessly and without backlash to rectilinear movement utilized to drive an output element.

What is claimed is:

1. An electromagneto-mechanical actuator comprising, a torque motor including a rotor and a stator, and band drive means operatively associated with said motor and including a tensioned flexible resilient band having opposite end portions and an intermediate loop portion, a drum member arranged to pivot with said rotor about the pivotal axis of said rotor and having a cylindrical peripheral surface concentric with said axis, said band intermediate loop portion being wrapped around said surface and secured to said drum member against relative circumferential movement, a yoke member arranged for rectilinear movement along a line perpendicular to said axis, means securing one of said band end portions to said yoke member, means securing the other of said band end portions to said yoke member, and an output drive element extending from said yoke member.

2. An electromagneto-mechanical actuator according to claim 1 wherein said band intermediate loop portion includes a web part for attachment to said drum member, a central strip part extending between said web part and one of said band end portions and a pair of laterally spaced strip parts extending between said web part and the other of said band end portions, said central strip part projecting through the space between said pair of laterally spaced strip parts.

3. An electromagneto-mechanical actuator according to claim 2 wherein the transverse area of said central strip part is substantially equal to the sum of the transverse areas of said pair of laterally spaced strip parts.

4. An electromagneto-mechanical actuator according to claim 2 wherein said band intermediate loop portion and said band end portions are an integral element of substantially uniform thickness throughout its length and [each] *the sum of the widths* of said laterally spaced strip parts [has] *is* substantially [the same transverse] *equal to the* width [as] *of* said central strip part.

5. An electromagneto-mechanical actuator according to claim 2 which further comprises band securing means cooperating with said web part for securing said band to said drum member against relative circumferential movement, and band tensioning means cooperating with said web part for tensioning said band.

6. An electromagneto-mechanical actuator according to claim 5 wherein said drum member has a generally radial recess, said web part has a hole therethrough, and said band securing means comprises a stake extending through said hole and received in said recess.

7. An electromagneto-mechanical actuator according to claim 6 wherein said drum member has a groove recessed from said surface and said stake recess is at the base of said groove and internally threaded, said hand tensioning means comprises a block having an inner end face and an outer end face and a through hole extending between said end faces and projecting at least partially into said groove and arranged with said inner end face spaced from said base, said through hole being aligned with said hole in said web part, and said stake being a screw having a shank extending through said holes and threadedly engaged in said threaded recess and also having a head bearing against said outer end face, said web part extending along the walls of said groove and over said inner end face, whereby turning said screw adjusts the tension in said band.

8. An electromagneto-mechanical actuator according to claim 2 wherein said central and laterally spaced strip parts collectively wrap around said surface of said drum member circumferentially through only a single revolution whereby the remote unwrapped terminal portions of said parts leave said surface tangentially at substantially the same point.

9. An electromagneto-mechanical actuator according to claim 8 wherein said yoke member has a flat surface, said terminal portions are flat and substantially coplanar and lie against said flat surface.

10. An electromagneto-mechanical actuator according to claim 1 wherein said rotor includes a shaft and a permanent magnet mounted thereon for rotation therewith and having a first pole end face of one polarity and a second pole end face of the opposite polarity at a different circumferential location from said first pole end face, said stator including a first coil and a second coil, said first coil having an arcuate extent greater than the circumferential width of said first pole end face and spaced therefrom to provide therebetween a first constant air gap throughout an excursive range of circumferential movement of said first pole end face relative to said first coil, and said second coil having an arcuate extent greater than the circumferential width of said second pole end face and spaced therefrom to provide therebetween a second constant air gap throughout an excursive range of circumferential movement of said second pole end face relative to said second coil.

11. An electromagneto-mechanical actuator according to claim 10 wherein said stator includes a ring, said first and second coils are wound on different arcuate portions of said ring, and further comprises means for limiting the pivotal movement of said rotor about said axis to provide said excursive ranges.

12. An electromagneto-mechanical actuator according to claim 11 which further comprises a housing, and means securing said stator ring to said housing, said shaft being journaled at opposite ends on said housing and including a first section provided with an opening and a second section which provides said drum member, said magnet being a straight bar extending diametrically through said opening and being secured to said shaft.

13. An electromagneto-mechanical actuator according to claim 12 wherein said means for limiting the pivotal movement of said rotor comprises a pair of circumferentially spaced generally radially extending stop surfaces on said shaft and a pair of stop pins supported by said housing and severally arranged to abuttingly engage said stop surfaces.

14. An electromagneto-mechanical actuator according to claim 13 wherein said shaft includes a third section having a generally radial recess, a stop post mounted in said recess and having an exposed outer head part which provides said stop surfaces, and said stop pins being screws mounted on said housing for adjustment relative to said stop surfaces.

15. An electromagneto-mechanical actuator according to claim 12 wherein said output drive element is a rod rigidly connected to said yoke member and is guided on said housing to project therefrom.

* * * * *